(12) United States Patent
Bostick et al.

(10) Patent No.: US 9,908,411 B2
(45) Date of Patent: Mar. 6, 2018

(54) AVOIDING VEHICLE COLLISION USING SIGNALS FROM MOBILE DEVICES

(71) Applicant: International Business Machines Corporation, Armonk, NY (US)

(72) Inventors: James E. Bostick, Cedar Park, TX (US); Paul Alexander Raphael Frank, Berlin (GE); John M. Ganci, Jr., Cary, NC (US); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/191,337

(22) Filed: Jun. 23, 2016

(65) Prior Publication Data

US 2017/0368937 A1 Dec. 28, 2017

(51) Int. Cl.
| | |
|---|---|
| *G06F 19/00* | (2011.01) |
| *B60K 31/00* | (2006.01) |
| *G01S 5/00* | (2006.01) |
| *G01S 5/02* | (2010.01) |
| *H04W 4/02* | (2018.01) |

(52) U.S. Cl.
CPC ........ *B60K 31/0008* (2013.01); *G01S 5/0072* (2013.01); *G01S 5/0289* (2013.01); *H04W 4/027* (2013.01); *B60K 2031/0025* (2013.01); *B60K 2031/0033* (2013.01); *B60K 2031/0091* (2013.01)

(58) Field of Classification Search
CPC . B60K 31/0008; G01S 5/0072; G01S 5/0289; H04W 4/027

USPC .......................................................... 701/70
See application file for complete search history.

(56) References Cited

U.S. PATENT DOCUMENTS

| | | | |
|---|---|---|---|
| 5,285,188 A | 2/1994 | Yoshida | |
| 7,289,019 B1 | 10/2007 | Kertes | |
| 8,447,437 B2* | 5/2013 | Chiang | G08G 1/165 340/435 |

(Continued)

FOREIGN PATENT DOCUMENTS

| | | |
|---|---|---|
| DE | 19741631 A1 | 3/1999 |
| EP | 1375267 A2 | 1/2004 |

OTHER PUBLICATIONS

Motorola et al.; Method for Enhancement of Vehicle Collision Avoidance Systems by Translation of Events to Alternate Human Senses, Apr. 26, 2001.

(Continued)

*Primary Examiner* — Muhammad Shafi
(74) *Attorney, Agent, or Firm* — Garg Law Firm, PLLC; Rakesh Garg; Christopher K. McLane

(57) ABSTRACT

A broadcast of a signal is received at a first system from a second system at a first time. From the signal, a location of a target associated with the second system and a velocity of the target are determined relative to a location of the first system and a velocity of the first system. At the first system, using the location and the velocity of the first system and using the location and the velocity of the target, a likelihood is computed of a collision between the first system and the second system. A notification is sent from the first system about the likelihood of collision responsive to the likelihood of collision exceeding a threshold likelihood.

17 Claims, 8 Drawing Sheets

(56) References Cited

U.S. PATENT DOCUMENTS

| | | | |
|---|---|---|---|
| 9,208,678 | B2 | 12/2015 | Albertson et al. |
| 9,253,753 | B2 * | 2/2016 | Rubin ................. H04W 72/005 |
| 9,443,426 | B1 * | 9/2016 | Formwalt ................ G08G 1/04 |
| 2005/0073438 | A1 * | 4/2005 | Rodgers ................ G08G 1/166 |
| | | | 340/944 |
| 2013/0142393 | A1 | 6/2013 | Lord |
| 2013/0279392 | A1 * | 10/2013 | Rubin ................. H04W 72/005 |
| | | | 370/312 |
| 2014/0300739 | A1 | 10/2014 | Mimar |

OTHER PUBLICATIONS

Anonymously; The Cooperative Intersection, Collision Avoidance System for Crossing Path Violations, Aug. 4, 2008.
Mercedes-Benz; Decades of preparation. Milliseconds of proof.; https://www.mbusa.com/mercedes/benz/safety#module-2, 2016.
Appendix P, 2016.

* cited by examiner

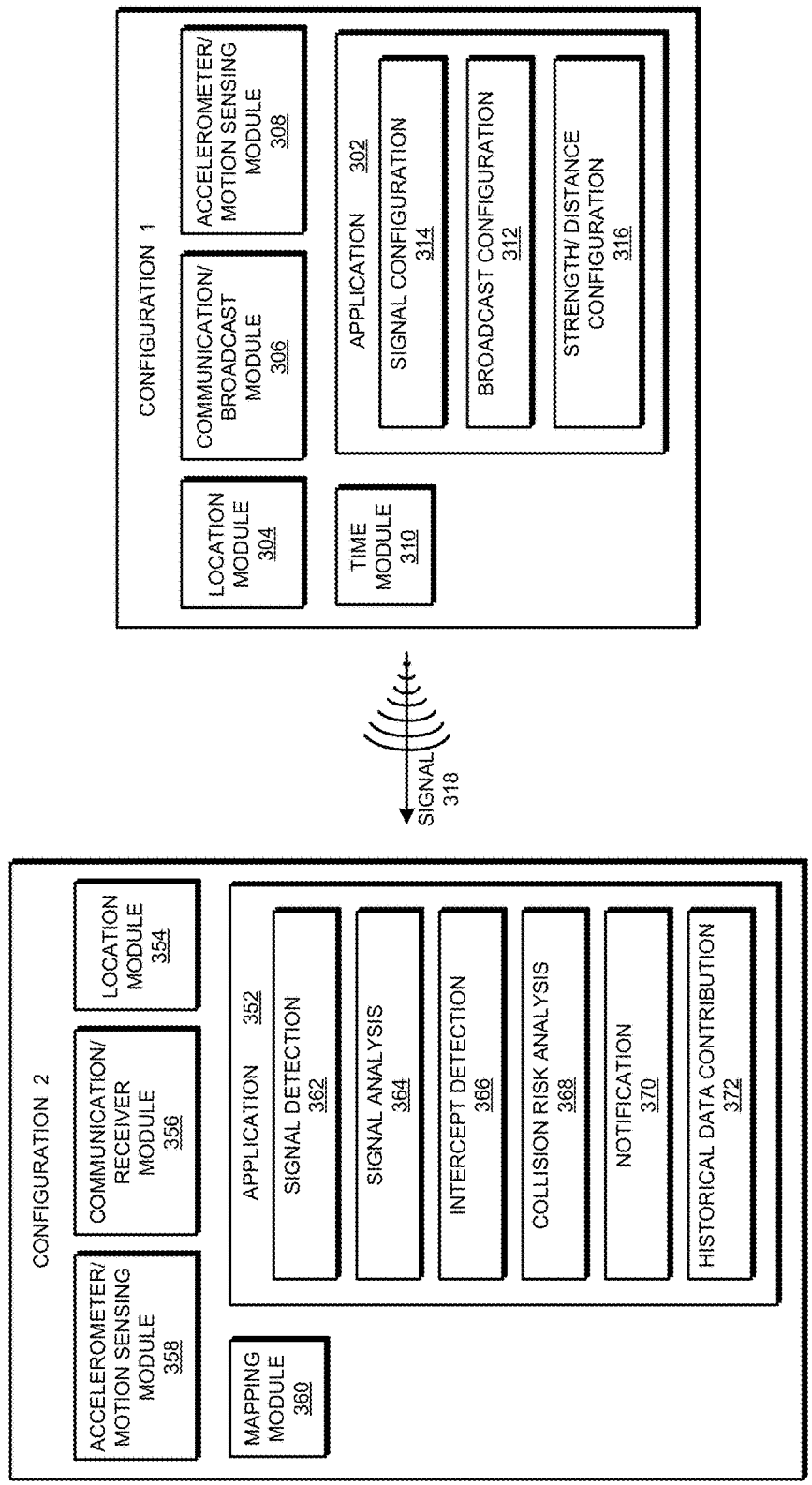

US 9,908,411 B2

AVOIDING VEHICLE COLLISION USING SIGNALS FROM MOBILE DEVICES

TECHNICAL FIELD

The present invention relates generally to a method, system, and computer program product for avoiding a collision between a vehicle and other participants of road traffic. More particularly, the present invention relates to a method, system, and computer program product for avoiding vehicle collision using signals from mobile devices.

BACKGROUND

Wireless communications (mobile communications) enable users to perform a variety of tasks using their mobile devices. An ever increasing number of applications is available for the wireless data processing systems, wireless data communication devices, or wireless computing platforms (collectively and interchangeably referred to herein as "mobile device" or "mobile devices"). For example, many mobile devices not only allow the users to make voice calls, but also exchange emails and messages, access remote data processing systems, determine a user's location or activity, communicate with other mobile devices or data processing systems, or perform web-based interactions and other transactions.

Wearable devices are a category of mobile devices. A wearable device is essentially a mobile device, but has a form-factor that is suitable for wearing the device on a user's person. A user can wear such a device as an article of clothing, clothing or fashion accessory, jewelry, a prosthetic or aiding apparatus, an item in an ensemble carried by or with a person, an article or gadget for convenience, and the like. Some examples of presently available wearable devices include, but are not limited to, smart watches, interactive eyewear, devices embedded in footwear, devices wearable as rings or pendants, and pedometers and other clip-ons.

Some wearable devices are independent wearable devices in that they can operate as stand-alone mobile devices. Such a wearable device either includes some or all the capabilities of a mobile device described above or does not need or use the capabilities of a mobile device described above.

Other wearable devices are dependent wearable devices in that they operate in conjunction with a mobile device. Such a wearable device performs certain functions while in communication with a mobile device described above.

Hereinafter, any reference to a mobile device, or simply "device", is intended to be inclusive of a mobile device of any kind that is capable of data communications, a wearable device that is capable of data communications—in a dependent or independent manner, or some combination thereof. Hereinafter, any reference to a wearable device, or simply a "wearable" or "wearables", is intended to be inclusive of a mobile device of any kind that is capable of data communications, a wearable device that is capable of data communications—in a dependent or independent manner, or some combination thereof.

A variety of wireless protocols enable communications to and from the mobile devices. For example, wireless standards such as Fourth Generation (4G) Long Term Evolution (LTE) allow data communication as well as voice communication on mobile devices. Bluetooth and Bluetooth LE protocols allow short-range device-to-device or device-to-data processing system communications.

SUMMARY

The illustrative embodiments provide a method, system, and computer program product. An embodiment includes a method that receives a broadcast, at a first system at a first time, of a signal from a second system. The embodiment further determines from the signal, relative to a location of the first system and a velocity of the first system, a location of a target associated with the second system and a velocity of the target. The embodiment further computes, using a processor and a memory at the first system, using the location and the velocity of the first system and using the location and the velocity of the target, a likelihood of a collision between the first system and the second system. The embodiment further sends a notification from the first system about the likelihood of collision responsive to the likelihood of collision exceeding a threshold likelihood.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a block diagram of an example configuration for avoiding vehicle collision using signals from mobile devices in accordance with an illustrative embodiment;

DETAILED DESCRIPTION

Figure 1:
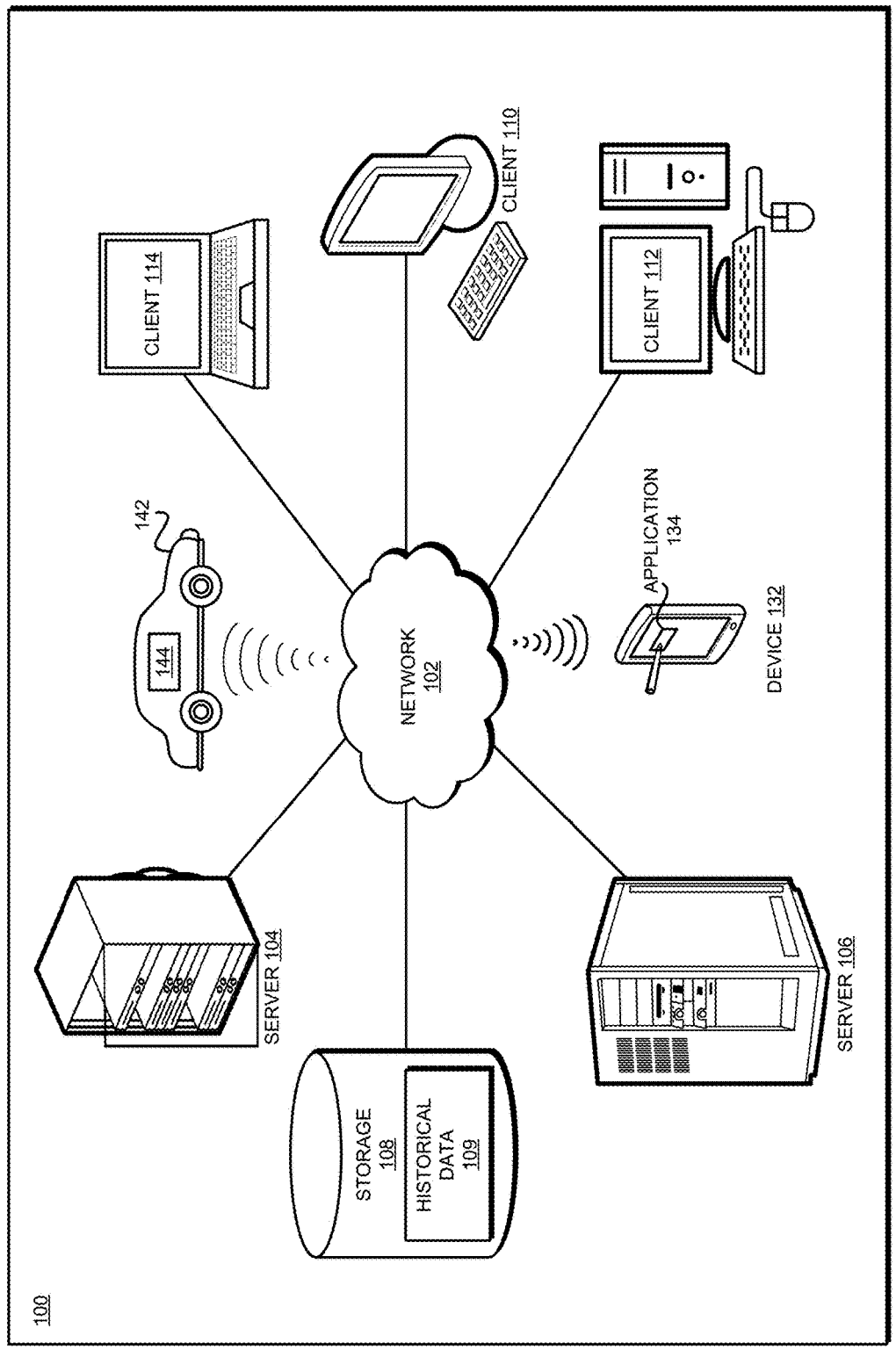
FIG. 1 depicts a block diagram of a network of data processing systems in which illustrative embodiments may be implemented.

As compared to the speeds attainable by a powered vehicle, many occupants of the roads are relatively slow-moving. Some examples of the slow-moving occupants of the roads include pedestrians, riders of bicycles, skates, and other human-powered apparatus, and the like. A slow-moving occupant of roads and other pathways is interchangeably referred to herein as "target". Hereinafter, a "vehicle" is a powered vehicle, e.g., a motorized vehicle or automotive, such as including but not limited to a motorcycle, car, truck, or a bus.

Powered vehicles involved in accidents with slow-moving occupants of the road are a source of danger to life and limb of all involved, and generally to a far greater degree of the slow-moving occupants. Many automotive manufacturers are constantly working on increasing the safety of the occupants of the automotive, and even of some slow-moving occupants of the road to some extent, with the addition of sophisticated driver assistance technologies. Many of these technologies use sonars, radars, and even lasers to detect the presence of other vehicles, pedestrians, debris, and other obstructions in the path of a vehicle. Many modern "connected" cars already come with a variety of driver assistance systems, which include emergency braking to avoid collisions between a vehicle and other vehicles, pedestrians, and other obstructions. Some of these technologies have a field of view that provides detection capabilities around the entire vehicle within some specified range or distance from the vehicle.

However, the illustrative embodiments recognize that the presently available driver assistance technologies in the presently available vehicles are still in their nascent stage, and are woefully inadequate for detecting obstructions in a large number of real-world circumstances. For example, targets, such as bicycles, are commonly present in populated areas where sidewalks are often blocked off by signs or vegetation. Such blockages prevent the target from being observable in the field of view of the driver or driver assistance system in the vehicle. While a presently available driver assistance system may be able to detect the obstruction created by the sign or the vegetation, the system is unable to detect targets that are obfuscated by the obstruction, or are not yet in the field of view or range of the system.

The illustrative embodiments recognize that in many cases, a target can approach a vehicle from an undetectable angle, from behind an obstruction, or from a distance, where the presently available vehicle-based sonar, radar, laser, or visual imaging technology is either of no use in detecting the target, or is unreliable in detecting the target, or reliably detects the target too late to avoid a collision.

The illustrative embodiments used to describe the invention generally address and solve the above-described problems and other problems related to avoiding a collision between a target and a vehicle.

An embodiment can be implemented as a software application. The application implementing an embodiment can be configured as a modification of an existing driver assistance system in a vehicle, as a separate application that operates in conjunction with an existing driver assistance system in a vehicle, as a modification of an existing location/activity monitoring module in a mobile device, as a separate application that operates in conjunction with an existing location/activity monitoring module in a mobile device, a split-application between a system in a vehicle and a module in a mobile device, a standalone application, or some combination thereof.

Some embodiments are configured to operate in a mobile device associated with a target. A configuration where an embodiment operates in a mobile device is referred to herein as configuration 1. Some embodiments are configured to operate in a vehicle. A configuration where the embodiment operates in a vehicle is referred to herein as configuration 2.

While the illustrative embodiments are described relative to configuration 1 or 2 specifically, the described embodiments are not limited to only those configurations. An embodiment described relative to configuration 1 can be implemented in configuration 2, and vice versa, within the scope of the illustrative embodiments. Furthermore, a mobile device may implement the embodiments of configurations 1 and 2, and similarly, a vehicle may implement the embodiments of configurations 1 and 2 within the scope of the illustrative embodiments.

A mobile device is associated with a target. The device is configured with a location module, which is able to determine the present location of the device, and by association the location of the target, at any given time. As a non-limiting example, the location module may generate the location coordinates of a location using the Global Positioning System (GPS), wireless triangulation, or some combination thereof. An embodiment in configuration 1 uses the location information to determine whether the target is located on a pathway where a possibility of a collision with a vehicle exists.

The device is also configured to detect an activity being performed by the target. For example, the location module of the device may be able and sufficient to determine that the target is stationary or moving. Optionally, an accelerometer or other motion sensing module may be able to determine whether the target is walking, cycling, skating, or moving in other ways. An embodiment in configuration 1 optionally uses the activity information to determine whether the target is moving relative to the pathway, such as walking along the pathway or cycling on or towards the pathway, such that a possibility of a collision between the target and a vehicle exists. Normally, but not always, a stationary target is relatively free of a possibility of a collision with a moving vehicle, a collision between a moving target and a stationary vehicle is also relatively harmless, but a moving target can collide with a moving vehicle with undesirable results.

The device is also configured with a time module. The time module may be an implementation of a clock that provides time information. An embodiment in configuration 1 optionally uses the time information to determine whether the activity of the target is occurring during the dark hours of the day. An embodiment in configuration 1 can also optionally use a light sensing module (not shown) to determine an amount of ambient light around the target for a similar purpose.

The device is also configured with a communication module that is capable of at least transmitting data wirelessly. An embodiment in configuration 1 uses the transmission capability of the communication module to broadcast a signal. Optionally, the communication module may also be configured to receive data wirelessly. An embodiment in configuration 1 uses the reception capability of the communication module to receive a broadcasted signal.

A signal according to the illustrative embodiments comprises specific data broadcast from a mobile device, or from a vehicle. Specifically, the signal includes a unique identifier, a tag, and a present location. The identifier of the signal is unique within a given geographical area where the broadcasting device or vehicle is positioned at a given time. The tag is any suitable identifier sufficient to indicate that the signal is meant for, or usable for, determining a position of the broadcaster. The present location is the approximate location of the broadcaster at the time of the broadcasting—i.e., during the negligible period during which the signal is constructed and broadcast.

The Operations of Certain Embodiments are Described with Respect to Configuration 1

An embodiment determines whether a signal should be broadcast. For example, the embodiment uses the location information, the activity information, the time information, or some combination thereof to make this determination. In one case, the embodiment broadcasts the signal regardless of where the target is located or the activity of the target, or the time of day. In another case, the embodiment broadcasts the signal where the target is located on or near a pathway but regardless of the activity of the target or the time of day.

In another case, the embodiment broadcasts the signal where the target is located on or near a pathway and engaged in a movement on or relative to the pathway but regardless of the time of day. In another case, the embodiment broadcasts the signal where the target is located on or near a pathway, is engaged in a movement on or relative to the pathway, and the time of day is configured to be hazardous to the target with respect to vehicular collision.

In another case, the embodiment receives the broadcast signals from a defined vicinity of a target's device. The embodiment determines whether other signals are being broadcast by others in the vicinity of the target. The embodiment omits the broadcasting when greater than a threshold number of other broadcasts are ongoing in the vicinity of the target. For example, when a person is moving with a crowd, if the devices of other people are already broadcasting similar signals, those other signals are likely to have the same collision avoidance effect according to the illustrative embodiments for the entire crowd, and the target's device need not add another broadcast.

If a signal has to be broadcasted from the target's device, another embodiment determines how strong that broadcast should be. For example, the radio strength of the broadcast may be a factor of the time of the day, the type of pathway near the target, the number of other targets in the vicinity of the target, the velocity of the target, and many other signal strength factors.

As an example, the strength may have to exceed one threshold if the broadcast is at night but may be below the threshold when made during the day. As another example, the strength may have to exceed one threshold power if the target is traveling at a threshold speed or greater, but may be below the threshold power when the speed is below the threshold speed. As another example, the strength may have to exceed one threshold power if less than a threshold number of other signals are present in the vicinity, i.e., the target may be alone, but may be below the threshold power when the number of other signals is at least the threshold number.

These examples of signal strength factors and manners of determining the same are not intended to be limiting. From this disclosure, those of ordinary skill in the art will be able to conceive many other adjustments to the signal strength of a broadcast, and reasons there for, and the same are contemplated within the scope of the illustrative embodiments.

Thus, an embodiment in configuration 1 decides whether to broadcast a signal, what data to broadcast in the signal, and how powerfully the signal should be broadcast. If a signal should be broadcast, the embodiment configures and broadcasts a signal with appropriate data at a determined strength. Periodically, the embodiment re-determines whether to broadcast a signal, what data to broadcast in the signal, and how powerfully the signal should be broadcast. The embodiment periodically configures and broadcasts appropriate signals until the embodiment determines that a signal should not be broadcast.

The Operations of Certain Embodiments are Described with Respect to Configuration 2

A vehicle is configured with a location module, which is able to determine the present location of the vehicle at any given time. As a non-limiting example, the location module may generate the location coordinates of a location using GPS, wireless triangulation, or some combination thereof. An embodiment in configuration 2 uses the location information in conjunction with a received broadcast of a signal from a target's device to determine whether the target is located on a pathway where a possibility of a collision with the vehicle exists.

The vehicle is also configured to detect a velocity of the vehicle. For example, the location module of the device may be able and sufficient to determine that the target is stationary or moving in a direction with a certain speed. Optionally, an accelerometer or other motion sensing module may be able to determine similar information about the movement of the vehicle. An embodiment in configuration 2 optionally uses the velocity information and the received signal from a target's device to determine whether the target is moving relative to the pathway on which the vehicle is traveling or expected to travel.

The vehicle is also configured with a mapping module. The mapping module applies or plots the vehicle's position and velocity, and the target's position and velocity, on a map. An embodiment in configuration 2 optionally uses the plot information to determine whether a projected path of the target and a projected path of the vehicle intersect and create a risk of collision.

The vehicle is also configured with a communication module that is capable of at least receiving data wirelessly. An embodiment in configuration 2 uses the reception capability of the communication module to receive a broadcast of a signal from a device associated with a target.

Optionally, the communication module may also be configured to transmit data wirelessly. An embodiment in configuration 2 uses the transmission capability of the communication module to broadcast a signal in a manner similar to broadcasting a signal from a device. A signal from the vehicle allows an embodiment in configuration 1 to similarly determine—on the device of a target—whether the projected path of the target can be expected to intersect with the projected path of the vehicle, creating a risk of collision.

An embodiment in configuration 2 detects or otherwise receives a signal. The embodiment analyzes the signal to determine a position and velocity of the target, e.g., by plotting the data of the signal on a map.

The embodiment determines whether a path of the vehicle intersects with a path of the target. For example, the embodiment plots the vehicle's position and velocity, and computes a projected path and expected time to travel to certain point or points on that path. The embodiment similarly determines one or more broadcasts of one or more signals from the target's device to determine the target's position and velocity. The embodiment plots the target's position and velocity and computes the target's projected path and expected time to travel to certain point or points on that path. The embodiment determines whether the vehicle and the target arrive at a common point after a common amount of elapsed time, thereby creating a risk of a collision.

In operation, the embodiment may receive multiple signals from multiple targets. The embodiment determines, in the above-described manner, which of the targets poses a risk of collision and at which point of intersection, given that target's projected path and times.

An embodiment further performs collision risk analysis. Assume that multiple targets are on various projected paths that intersect with the projected path of the vehicle. The collision risk analysis determines a likelihood of each such target's path interesting with the vehicle's path. To compute the likelihood, the embodiment uses a set of risk factors.

A risk factor is a factor that reduces or increases a risk of collision. Some non-limiting examples of a risk factor are described herein. For example, a speed of travel of the target is a risk factor because generally, the faster the target is traveling the higher the risk is of a collision.

As another example, an acceleration (or deceleration) of the target is a risk factor because generally, a target that is speeding up is at a higher risk of a collision than a target that is slowing down. As another example, visibility of the target is a risk factor because generally, a target that is occluded or obscured is at a higher risk of a collision than a target that is visible. The occlusions or obstructions between the vehicle and the target can be determined using satellite imagery from the map data in the mapping module. The greater the degree of occlusion between the vehicle and the target up to the point of intersection, the higher the risk, and vice versa.

As another example, an obstruction in the path of the target is a risk factor because generally, a target that is unobstructed—and hence can continue on the path without stopping or slowing down for the obstruction—is at a higher risk of a collision than a target that is obstructed. Some examples of the obstructions are traffic lights, traffic signs, barricades, crosswalks and other traffic control devices.

Obstruction-based risk factors can be evaluated differently under different circumstances. Suppose that a vehicle where an embodiment is executing is approaching a stop sign obstruction. As one example, by considering the vehicle's speed and proximity to an obstruction, the embodiment may determine that the vehicle is not slowing down at a desired deceleration, thereby increasing the risk of a collision with a pedestrian that is approaching the intersection where the stop sign is located. As another example, by considering the vehicle's speed and proximity to an obstruction, the embodiment may determine that the vehicle is slowing down at a desired deceleration, thereby decreasing the risk of a collision with a pedestrian that is approaching the intersection where the stop sign is located. As another example, by considering the cyclist's speed and proximity to an obstruction, the embodiment may determine that the cyclist is not slowing down at a desired deceleration, thereby increasing the risk of a collision with the vehicle where the embodiment is executing. As another example, by considering the cyclist's speed and proximity to an obstruction, the embodiment may determine that the cyclist is slowing down at a desired deceleration, thereby decreasing the risk of a collision with the vehicle where the embodiment is executing.

As another example, the weather condition at the time is a risk factor because generally, a target that is traveling in undesirable weather—such as fog or rain—is at a higher risk of a collision than a target that is traveling in desirable weather.

As another example, the historical information about the projected path of the vehicle may be a risk factor. For example, the historical information about past collisions on the path may indicate that the path has more than a threshold number of collision incidents, making the risk of collision more likely on the path.

As another example, the historical information about a target may be a risk factor. For example, the historical information about collisions related to signals from a particular device may indicate that the target has been involved in more than a threshold number of collision incidents, making the risk of collision with the target more likely on the path.

These examples of risk factors are not intended to be limiting. From this disclosure, those of ordinary skill in the art will be able to conceive many other risk factors and the same are contemplated within the scope of the illustrative embodiments.

When a risk or likelihood of collision of greater than a threshold likelihood is identified between the vehicle and a target, an embodiment notifies a system in the vehicle or an operator of the vehicle. For example, the notification may be sent to an actuation system that causes the velocity of the vehicle to change.

When the embodiment is implemented in configuration 1, the embodiment notifies the target or an actuation system associated with the target. The notification essentially informs about the risk of collision, but can be configured to include additional information as may be desirable or suitable in a given implementation. For example, the notification can include the present locations of the vehicle and the target, the projected intersection point, time to the intersection point, risk factors, and many other pieces of information depending upon the implementation.

An embodiment in configuration 1 or 2 can be enabled to contribute risk of collision data to a historical repository. For example, when an actual collision occurs, or a risk of collision is detected at greater than a threshold likelihood, the embodiment sends to the historical repository, the location and velocity information of the vehicle and the target, risk factors, signal information, or some combination thereof. The embodiment may normalize the data before contributing to the historical repository, e.g., by removing personally identifying information about the vehicle or the target.

A method of an embodiment described herein, when implemented to execute on a device or data processing system, comprises substantial advancement of the functionality of that device or data processing system in avoiding a collision between vehicle and a target. For example, presently available methods for collision avoidance rely on detecting the presence of a target in the vehicle-implemented driver assistance system's field of view. An embodiment provides a method by which an obscured target outside a vehicle-based system's field of view can be detected, and a collision with such target can be forecasted with corresponding likelihood. This manner of avoiding vehicle collision using signals from mobile devices is unavailable in the presently available methods. Thus, a substantial advancement of such devices or data processing systems by executing a method of an embodiment is in improved collision avoidance between vehicles and targets.

The illustrative embodiments are described with respect to certain types of targets, vehicles, systems, signals, transmissions, analyses, projections, risks, likelihoods, factors, notifications, historical information, modules, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
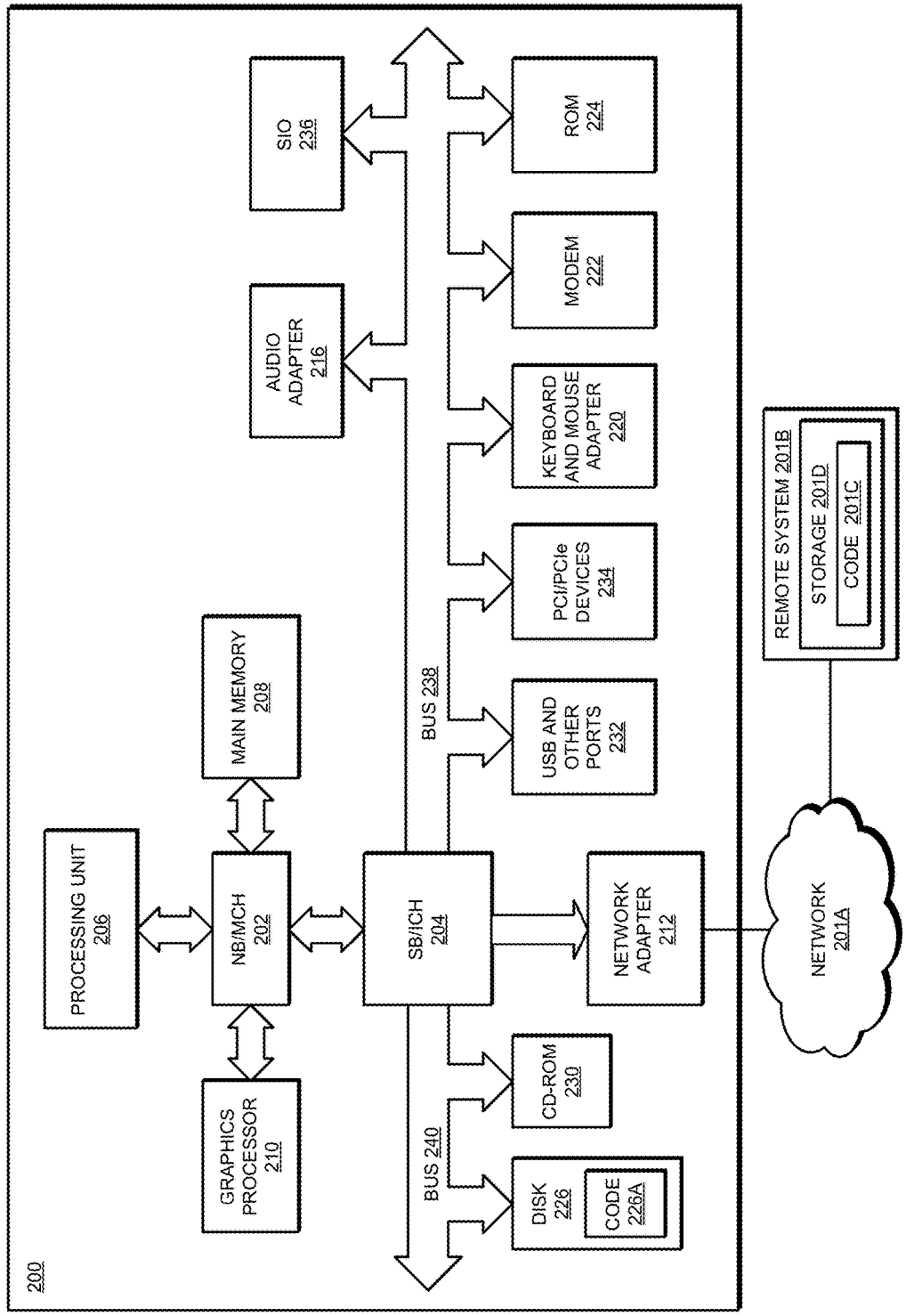
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Automobile 142 is an example of a vehicle described herein and includes a system on which an embodiment described herein can be implemented. For example, application 144 in vehicle 142 implements an embodiment described herein with respect to configuration 2. Device 132 is associated with a target as described herein. Application 134 implements an embodiment described herein with respect to configuration 1. Note again that vehicle 142 can also implement configuration 1 and embodiments there for, and device 132 can also implement configuration 2 and embodiments there for. Generally, vehicle 142 and device 132 can each implement configuration 1, configuration 2, or both configurations 1 and 2, within the scope of the illustrative embodiments. Historical data 109 is usable by an embodiment in application 134 or application 144 in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 and vehicle 142 in FIG. 1 in which computer usable program code or instructions implementing the processes of the illustrative embodiments may be located. Data processing system 200 is described as a computer only as an example, without being limited thereto. Implementations in the form of other devices, such as device 132 or vehicle 142 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 134 and 144 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

With reference to FIG. 3, this figure depicts a block diagram of an example configuration for avoiding vehicle collision using signals from mobile devices in accordance with an illustrative embodiment. Application 302 is an example of application 134 in FIG. 1 and is configured in configuration 1 as described herein. Application 302 can also be implemented in application 144 in FIG. 1 and configured in configuration 2 as described herein, within the scope of the illustrative embodiments. Application 352 is an example of application 144 in FIG. 1 and is configured in configuration 2 as described herein. Application 302 can also be implemented in application 144 in FIG. 1 and configured in configuration 1 as described herein, within the scope of the illustrative embodiments.

Application 302 uses one or more of location module 304, communication module 306, motion sensing module 308, and time module 310 as described herein. Using one or more modules 304-310 as described herein, component 312 determines whether a broadcast of a signal should be made. If a broadcast should be made, component 314 constructs a signal using the location information from location module 304 in the signal data. Component 316 evaluates a set of signal strength factors using the data from one or more of modules 304-310 as described herein, and configures communication module 306 to an appropriate radio transmission power. Component 316 is optional when the broadcast is configured to occur at a default power setting.

Application 302 wirelessly broadcasts signal 318 if component 312 has determined that the broadcast should be performed. From time to time, application 302 broadcasts signal 318 with revised data pertinent at the time. In one embodiment, subsequent broadcasts of signal 318 are a function of a velocity of configuration 1. For example, if the velocity of the target increases, the time gap between consecutive signals decreases, and vice versa.

Application 352 uses one or more of location module 354, communication module 356, motion sensing module 358, and mapping module 360 as described herein. When configurations 1 and 2 are implemented in the same system, e.g., in vehicle 142 or in device 132, location modules 304 and 354 can be one and the same, communication modules 306 and 356 can be one and the same, and motion sensing modules 308 and 358 can be one and the same.

Component 362 detects signal 318. Component 364 analyzes one or more instances of signal 318 as described herein.

Using one or more modules 354-360 and the analyzed signal data as described herein, component 366 determines whether the projected paths of the vehicle and the target intersect at a common point and common time. If the paths intersect, component 368 computes a likelihood or risk of collision as described herein. If the likelihood exceeds a threshold likelihood, component 370 notifies a person—e.g. the driver of the vehicle or the target. Component 372 contributes the signal data, the risk data, factors data, or some combination of a normalized form thereof, to a historical repository, e.g., in the form of historical data 109 to repository 108 in FIG. 1.

Figure 4A:
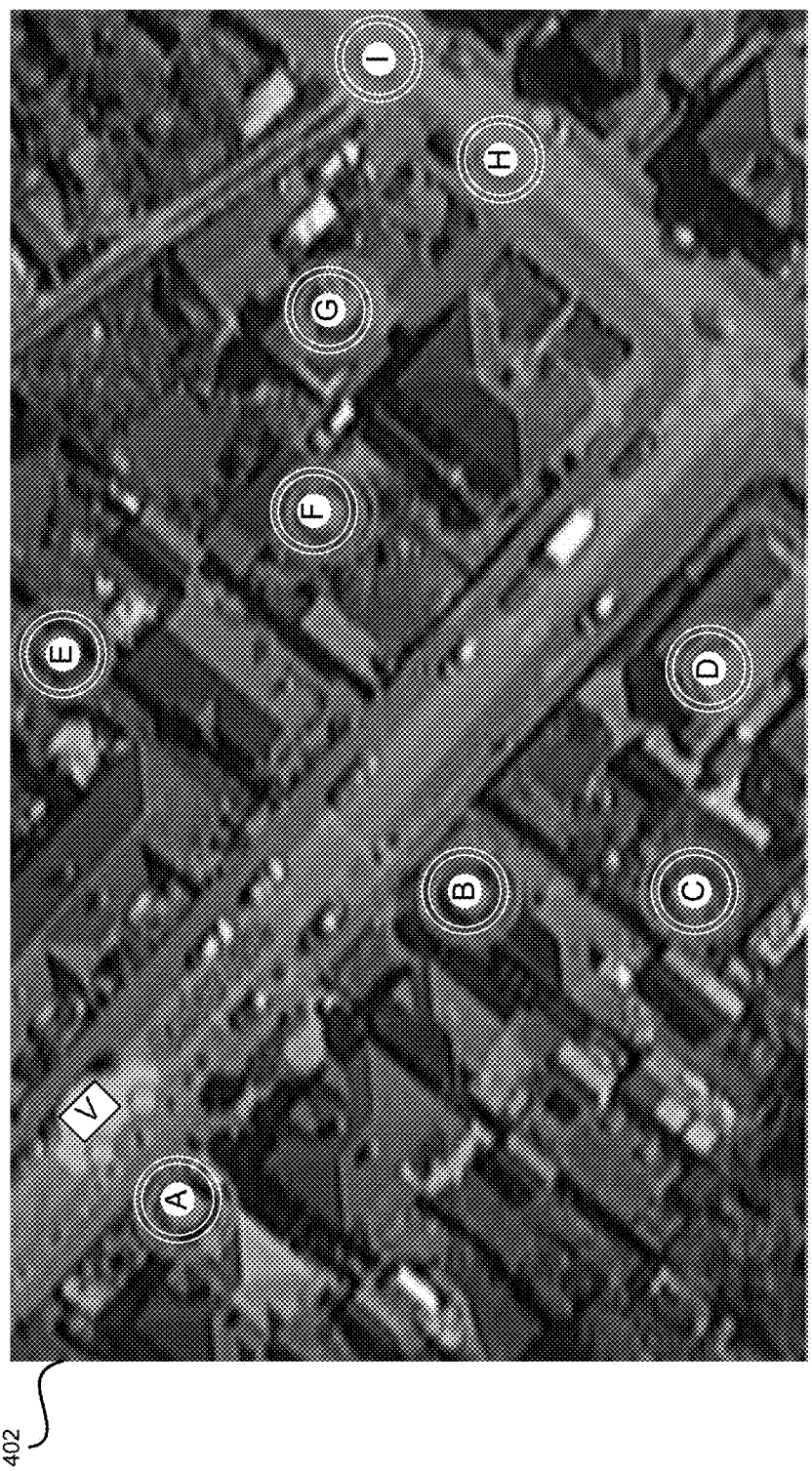
FIG. 4A depicts a position plotting using map data in accordance with an illustrative embodiment.

With reference to FIG. 4A, this figure depicts a position plotting using map data in accordance with an illustrative embodiment. Map 402 may be obtained from mapping module 360 in FIG. 3. Application 352 performs the plotting on map 402 as shown.

Assume as an example that vehicle V implements configuration 2, and application 352 therein. The application plots the position of vehicle V when signals from multiple targets—A, B, C, D, E, F, G, H, and I—are received by the application. By analyzing the signals from the various targets, the application plots the positions of those targets as determined from their signals received at the application. The positions of the targets A-I are plotted relative to the position of vehicle V on map 402 as shown.

Figure 4B:
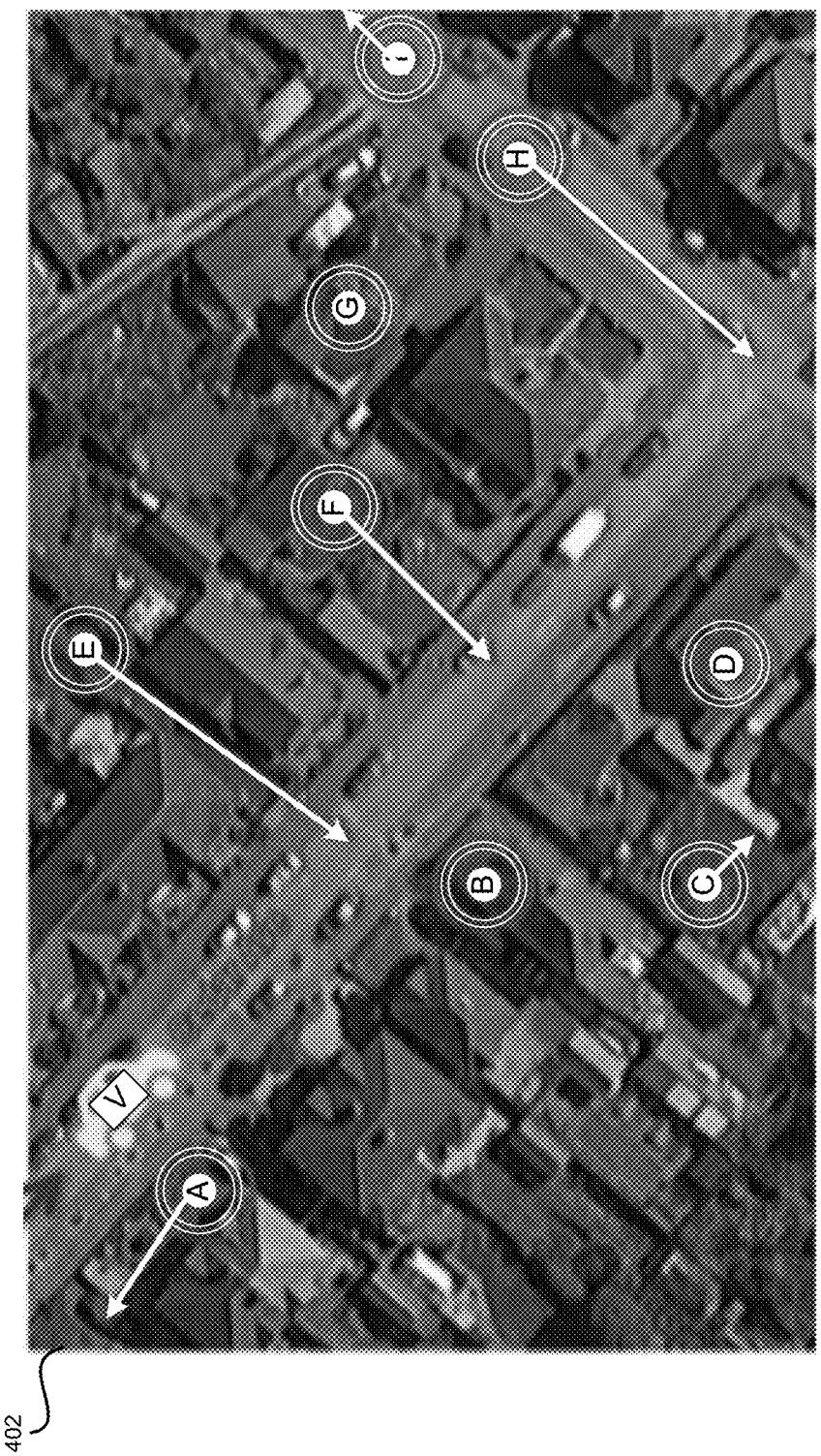
FIG. 4B depicts a velocity plotting using map data in accordance with an illustrative embodiment.

With reference to FIG. 4B, this figure depicts a velocity plotting using map data in accordance with an illustrative embodiment. Map 402 may be obtained from mapping module 360 in FIG. 3. Application 352 performs the plotting on map 402 as shown.

By analyzing one or more signals received from each of targets A-I, the application plots their speed and direction. Only to visually express an inventive operation described herein, the speed of a target is shown on map 402 as the lengths of the arrow and the direction of movement is indicated by the direction of the arrow originating from a target's position. Note that such visual representation on a visual map is not necessary for the functioning of an embodiment, and may be omitted in an implementation without departing the scope of the illustrative embodiments.

The analysis reveals that targets B, D, and G are broadcasting but are stationary. The analysis further shows that targets A, C, E, F, H, and I are moving in various directions at various speeds relative to vehicle V.

Figure 4C:
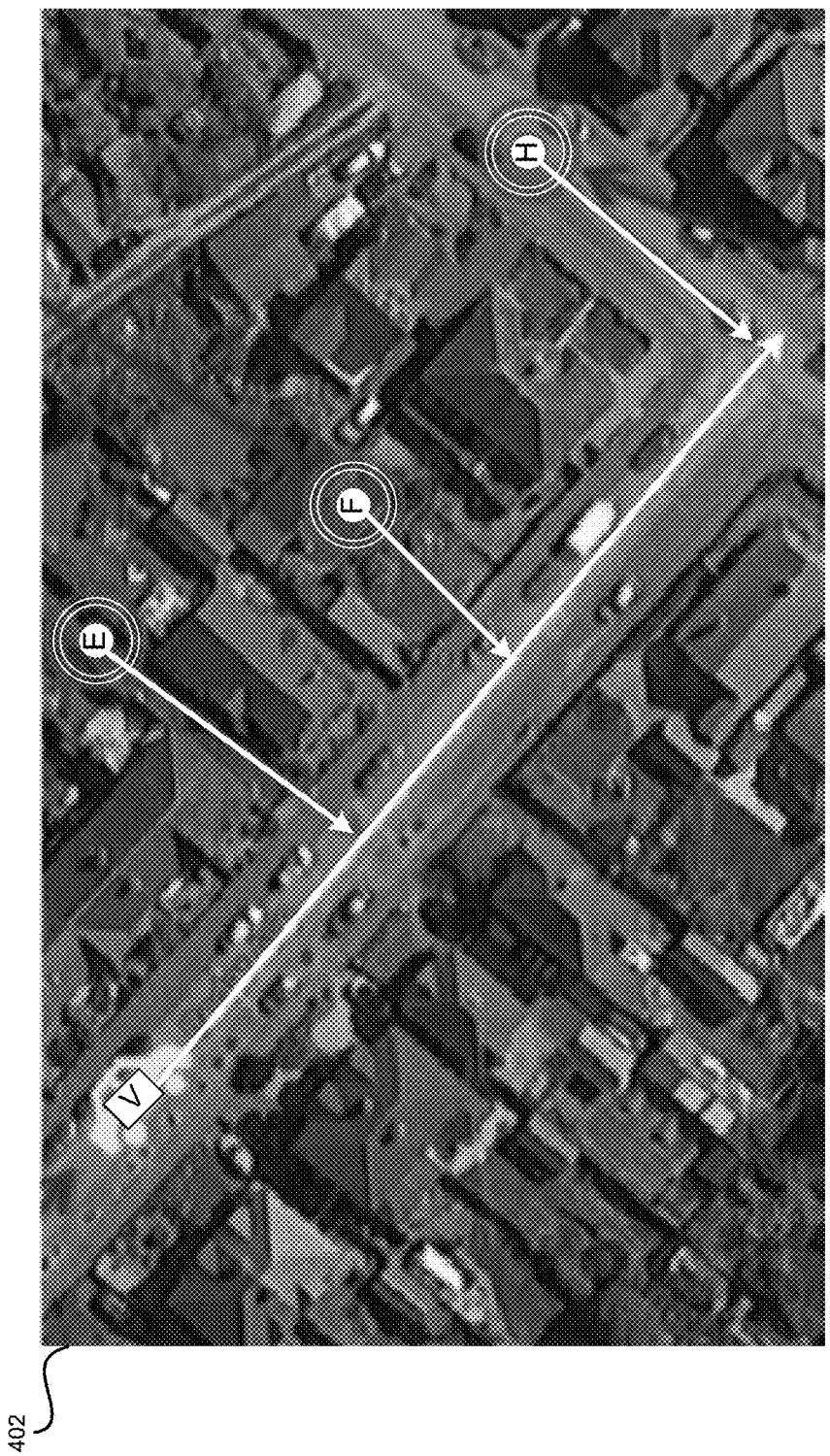
FIG. 4C depicts a map plotting of a risk of collision in accordance with an illustrative embodiment.

With reference to FIG. 4C, this figure depicts a map plotting of a risk of collision in accordance with an illustrative embodiment. Map 402 may be obtained from mapping module 360 in FIG. 3. Application 352 performs the plotting on map 402 as shown.

Intercept detection function of the application determines that vehicle V is projected to travel on the path identified by the arrow based at vehicle V, as shown. If a route navigation is planned, the application can also determine whether vehicle V will continue on the present pathway or leave the present pathway and turn onto another pathway in the projected path. The application then determines the potential intersections in the projected path including the turns and changes in the pathway.

Intercept detection function of the application determines that given their directions of travel, the projected paths of targets A, C, and I will likely not Intersect with the projected path of vehicle V. Intercept detection function of the application determines that given their directions of travel, the projected paths of targets E, F, and H will likely intersect with the projected path of vehicle V.

Collision analysis function of the application evaluates the various risk factors that may be applicable to each of targets E, F, and H to determine the likelihood or the risk of collision with vehicle V. Assume as an example that target E is a cyclist on a side path, target F is a soccer player in a backyard, and target H is a pedestrian on a cross street. Further assume that there are two thresholds of likelihood on a scale of 0 to 1, namely 0.33 and o.66.

Using one or more of the risk factors described herein, e.g., the velocity of the target, the application determines that target E has a likelihood of 0.7 and target H has a likelihood of 0.5. Similarly, using one or more of the risk factors described herein, e.g., obstructions in the path of the target, the application determines from a satellite image that target F is fenced-in and cannot easily access the pathway of vehicle V from behind the fence. Therefore, the application determines that target F has likelihood of 0.1.

Thus, the application determines that the risk of collision with the cyclist on the side path is higher than the high threshold, the risk of collision with the soccer player is lower than the low threshold, and the risk of collision with the pedestrian on the cross street is between the two thresholds. Note that at time of the likelihood determination according to an embodiment, none of targets E, F, or H may be in the field of view of vehicle V and therefore may not even be detected by a prior-art driver assistance system in vehicle V.

Figure 5:
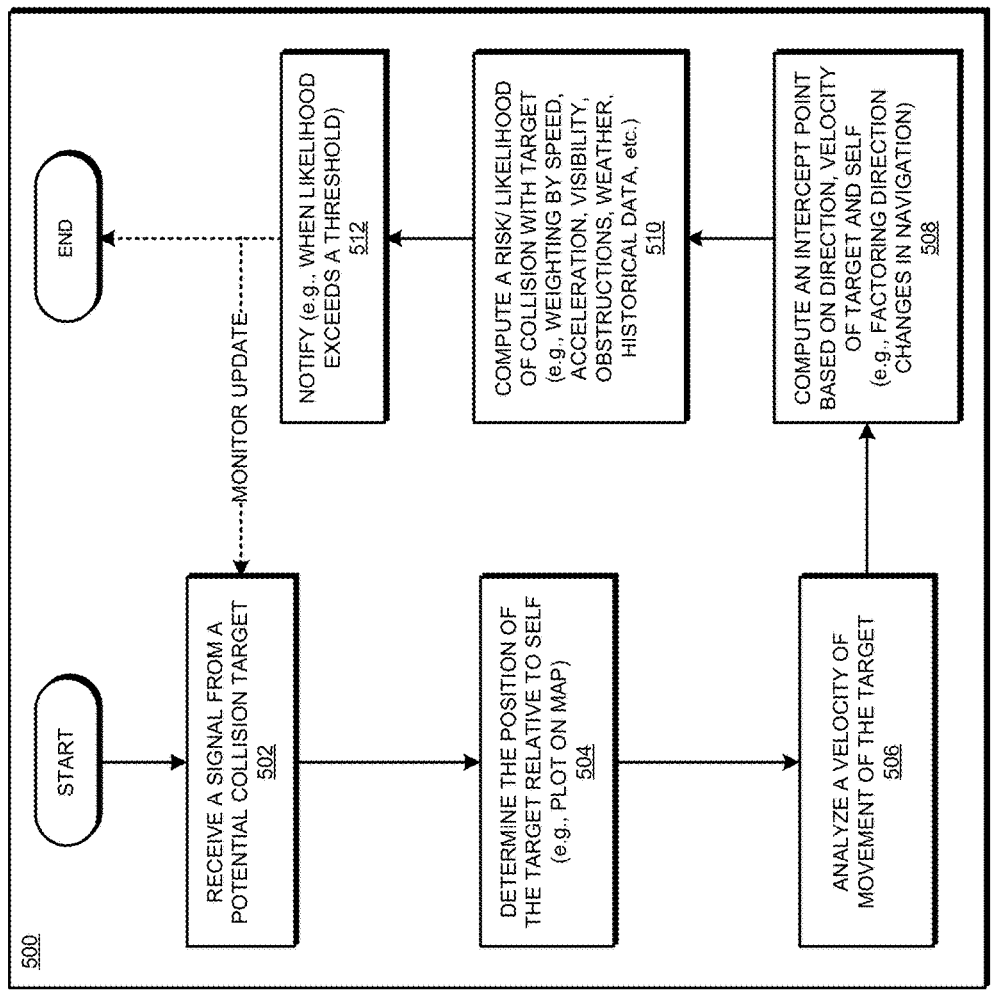
FIG. 5 depicts a flowchart of an example process for avoiding vehicle collision using signals from mobile devices in accordance with an illustrative embodiment.

With reference to FIG. 5, this figure depicts a flowchart of an example process for avoiding vehicle collision using signals from mobile devices in accordance with an illustrative embodiment. Process 500 can be implemented in application 352 in configuration 2 of FIG. 3.

For any one of a number of targets that may be broadcasting at any given time, the application receives a signal from a target (block 502). The application determines a position of the target relative to the position of a system where the application is executing (a position of self) (block 504). The application analyzes the signal or multiple instances of the signal received at different times, to determine a velocity, i.e., a speed and a direction, of the movement of the target (block 506).

The application computes an intersection point between a projected path of self and a projected path of the target (block 508). The computation of block 508 accounts for any navigation related direction changes of self.

The application computes a likelihood or risk of collision with the target (block 510). The application accounts for any number of risk factors that can play a role in the collision. When the likelihood exceeds a threshold likelihood, the application sends a notification of a risk of collision (block 512). The application may continue to monitor additional broadcasts from the target to detect any changes in the path or velocity of the target, or may end process 500 thereafter.

Figure 6:
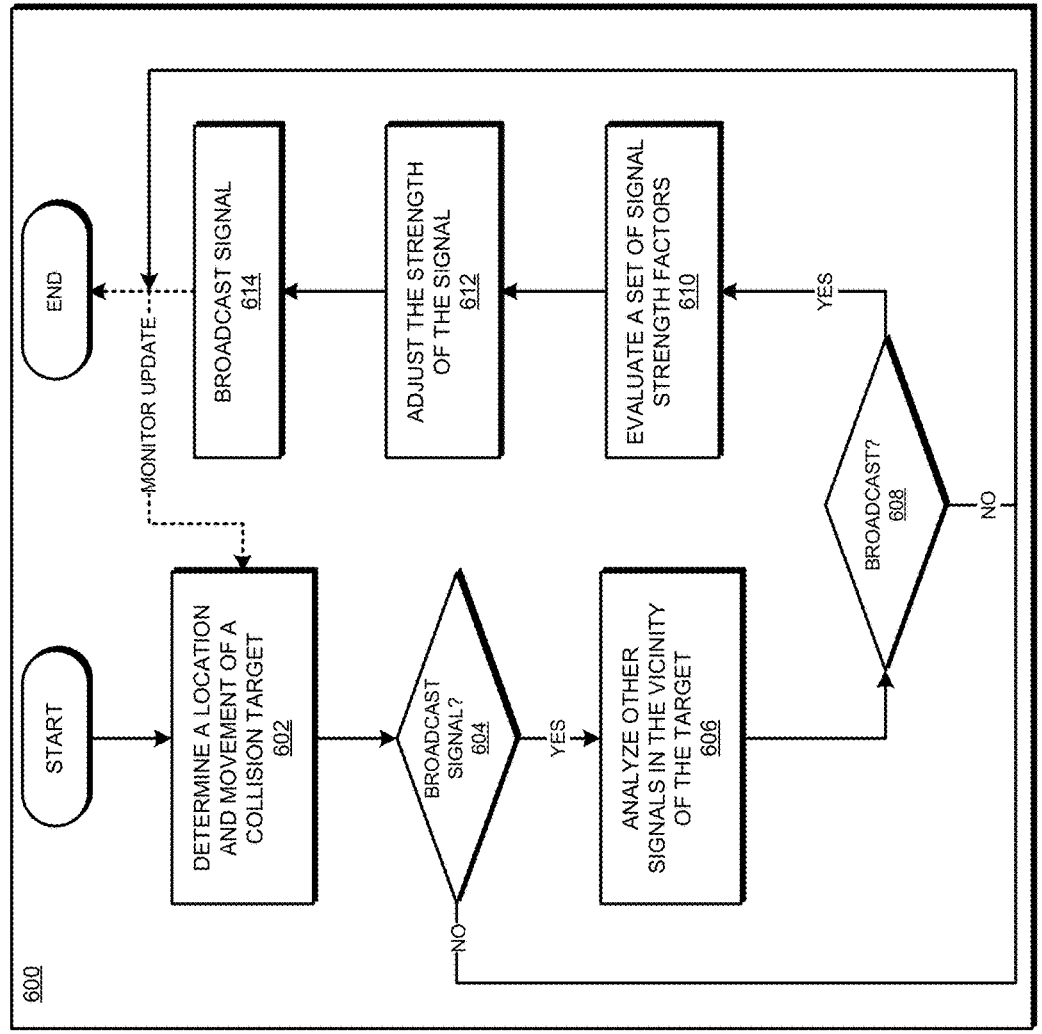
FIG. 6 depicts a process for configuring and broadcasting a collision avoidance signal in accordance with an illustrative embodiment.

With reference to FIG. 6, this figure depicts a process for configuring and broadcasting a collision avoidance signal in accordance with an illustrative embodiment. Process 600 can be implemented in application 302 in configuration 1 in FIG. 3.

The application determines a location and movement of a target (block 602). The application determines whether the location and/or movement of the target justifies broadcasting of a collision avoidance signal (block 604). If the broadcast is not justified ("No" path of block 604), the application ends process 600 thereafter or returns to block 602 to monitor changes in the location and or movement of the target.

If the broadcast is justified ("Yes" path of block 604), the application analyzes other signals in the vicinity of the target (block 606). The application determines, given the presence or absence of other signals in the vicinity, whether broadcast of a signal from the target is justified (block 608). If the broadcast is not justified ("No" path of block 608), the application ends process 600 thereafter or returns to block 602 to monitor changes in the location and or movement of the target.

If the broadcast is justified ("Yes" path of block 608), the application evaluates a set of signal strength factors (block 610). The application adjusts a strength of the signal based on the evaluation (block 612). The application broadcasts the signal (block 614). The application ends process 600 thereafter or returns to block 602 to monitor changes in the location and or movement of the target. If a change occurs in the location or movement of the target, the application uses process 600 to send an updated signal as described herein.

Thus, a computer implemented method, system or apparatus, and computer program product are provided in the illustrative embodiments for avoiding vehicle collision using signals from mobile devices and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of collision avoidance, comprising:
   receiving, at a first system in a vehicle at a first time, a broadcast of a signal from a second system, wherein the signal comprises (i) a unique identifier, (ii) an identifier indicative of a collision avoidance nature of the signal, and (iii) a location of the target;
   executing using a processor in the first system a signal analysis module to compute from the signal, the location of a target associated with the second system and a velocity of the target, wherein the location of the target is computed relative to a location of the first system, and wherein the velocity of the target is computed relative to a velocity of the first system;
   computing, using the processor and a memory at the first system, using the location and the velocity of the first system and using the location and the velocity of the target, a likelihood of a collision between the first system and the second system;
   analyzing historical collision data related to the first projected path to determine a historical collision risk associated with the first projected path;
   assigning a weight to the historical collision risk, wherein weight is a function of the historical collision risk; and
   using the weight and the historical collision risk in computing the likelihood of the collision;
   sending a notification from the first system to a system in the vehicle about the likelihood of collision responsive to the likelihood of collision exceeding a threshold likelihood; and causing an actuation mechanism in the vehicle to change a velocity of the first system to avoid the collision responsive to the notification.

2. The method of claim 1, further comprising:
analyzing historical collision data related to the second system to determine a historical collision risk associated with the second system;
assigning a weight to the historical collision risk, wherein weight is a function of the historical collision risk; and
using the weight and the historical collision risk in computing the likelihood of the collision.

3. The method of claim 1, further comprising:
assigning a weight to a weather condition on the first projected path, wherein weight is a function of a type of the weather condition; and
using the weight and the speed of the second system in computing the likelihood of the collision.

4. The method of claim 1, further comprising:
assigning a weight to an obstruction in the first projected path, wherein weight is a function of a type of the obstruction; and
using the weight in computing the likelihood of the collision.

5. The method of claim 1, further comprising:
assigning a weight to a visibility value in the first projected path, wherein weight is a function of the visibility value; and
using the weight and the visibility value in computing the likelihood of the collision.

6. The method of claim 1, further comprising:
assigning a weight to an acceleration of the second system, wherein weight is a function of the acceleration of the second system; and
using the weight and the acceleration of the second system in computing the likelihood of the collision.

7. The method of claim 1, further comprising:
assigning a weight to a speed of the second system, wherein weight is a function of the speed of the second system; and
using the weight and the speed of the second system in computing the likelihood of the collision.

8. The method of claim 1, further comprising:
computing, using the location and velocity of the first system, a first projected path of the first system;
computing, using the location and velocity of the second system, a second projected path of the second system; and
computing an intersection point between the first path and the second path.

9. The method of claim 8, further comprising:
receiving navigation information about a future change in a velocity of the first system; and
using the future change in the velocity of the first system in computing the first projected path.

10. The method of claim 1, further comprising:
receiving a second signal from the second system at a second time; and
using the signal and the second signal in determining the velocity of the target.

11. The method of claim 1, wherein the first system is configured in a vehicle.

12. The method of claim 11, wherein the signal further comprises one of (i) a timestamp corresponding to a time when the target was at the location of the target and (ii) the velocity of the target.

13. The method of claim 11, wherein the unique identifier is unique within a defined geographical area around the target.

14. A computer usable program product for collision avoidance comprising one or more computer-readable storage devices, and program instructions stored on at least one of the one or more storage devices, the stored program instructions comprising:
program instructions to receive, at a first system in a vehicle at a first time, a broadcast of a signal from a second system, wherein the signal comprises (i) a unique identifier, (ii) an identifier indicative of a collision avoidance nature of the signal, and (iii) a location of the target;
program instructions to execute using a processor in the first system a signal analysis module to compute from the signal, the location of a target associated with the second system and a velocity of the target, wherein the location of the target is computed relative to a location of the first system, and wherein the velocity of the target is computed relative to a velocity of the first system;
program instructions to compute, using the processor and a memory at the first system, using the location and the velocity of the first system and using the location and the velocity of the target, a likelihood of a collision between the first system and the second system;
program instructions to analyze historical collision data related to the first projected path to determine a historical collision risk associated with the first projected path;
program instructions to assign a weight to the historical collision risk, wherein weight is a function of the historical collision risk; and
program instructions to use the weight and the historical collision risk in computing the likelihood of the collision;
program instructions to send a notification from the first system to a system in the vehicle about the likelihood of collision responsive to the likelihood of collision exceeding a threshold likelihood; and
program instruction to cause an actuation mechanism in the vehicle to change a velocity of the first system to avoid the collision responsive to the notification.

15. The computer usable program product of claim 14, wherein the computer usable code is stored in a computer readable storage device in a data processing system, and wherein the computer usable code is transferred over a network from a remote data processing system.

16. The computer usable program product of claim 14, wherein the computer usable code is stored in a computer readable storage device in a server data processing system, and wherein the computer usable code is downloaded over a network to a remote data processing system for use in a computer readable storage device associated with the remote data processing system.

17. A vehicle comprising: a first system comprising a processor, a memory, and a computer-readable storage device, and program instructions stored on the computer-readable storage device for execution by the processor via the memory, the stored program instructions comprising:
program instructions to receive, at the first system at a first time, a broadcast of a signal from a second system, wherein the signal comprises (i) a unique identifier, (ii) an identifier indicative of a collision avoidance nature of the signal, and (iii) a location of the target;

program instructions to execute using the processor in the first system a signal analysis module to compute from the signal, the location of a target associated with the second system and a velocity of the target, wherein the location of the target is computed relative to a location of the first system, and wherein the velocity of the target is computed relative to a velocity of the first system;

program instructions to compute, using the processor and the memory at the first system, using the location and the velocity of the first system and using the location and the velocity of the target, a likelihood of a collision between the first system and the second system;

program instructions to analyze historical collision data related to the first projected path to determine a historical collision risk associated with the first projected path;

program instructions to assign a weight to the historical collision risk, wherein weight is a function of the historical collision risk; and program instructions to use the weight and the historical collision risk in computing the likelihood of the collision;

program instructions to send a notification from the first system to a system in the vehicle about the likelihood of collision responsive to the likelihood of collision exceeding a threshold likelihood; and program instruction to cause an actuation mechanism in the vehicle to change a velocity of the first system to avoid the collision responsive to the notification.

* * * * *